United States Patent [19]
Herr et al.

[11] Patent Number: 5,842,563
[45] Date of Patent: *Dec. 1, 1998

[54] STORAGE CONTAINER FOR INFORMATION-BEARING DISC DEVICES

[75] Inventors: Arthur G. F. Herr, New York, N.Y.; Robert W. Johnson, Naperville, Ill.; Toby S. Welles, Redding, Conn.

[73] Assignee: Laserfile International, Inc., Hollywood, Calif.

[*] Notice: The term of this patent shall not extend beyond the expiration date of Pat. No. 5,445,265.

[21] Appl. No.: 637,633

[22] PCT Filed: Feb. 3, 1995

[86] PCT No.: PCT/US95/01588

§ 371 Date: Mar. 29, 1996

§ 102(e) Date: Mar. 29, 1996

[87] PCT Pub. No.: WO96/21542

PCT Pub. Date: Jul. 18, 1996

[51] Int. Cl.⁶ ..................................................... B65D 85/57
[52] U.S. Cl. .................. 206/308.1; 206/232; 206/308.3; 206/555; 206/804
[58] Field of Search ............................... 206/308.1, 308.2, 206/308.3, 232, 309–313, 555, 804; 312/9.47, 9.48

[56] References Cited

U.S. PATENT DOCUMENTS

| | | |
|---|---|---|
| 2,500,773 | 3/1950 | Robins . |
| 2,848,106 | 8/1958 | Rice . |
| 2,850,158 | 9/1958 | Woodward . |
| 2,866,541 | 12/1958 | Ravis . |
| 3,232,421 | 2/1966 | Young . |
| 3,710,977 | 1/1973 | Van Der Enden . |
| 3,730,602 | 5/1973 | Campbell et al. . |
| 3,860,248 | 1/1975 | Hunt et al. . |
| 3,876,134 | 4/1975 | Rice et al. . |
| 3,888,350 | 6/1975 | Horvath . |
| 3,951,264 | 4/1976 | Heidecker et al. . |
| 4,084,694 | 4/1978 | Lainez et al. . |
| 4,174,034 | 11/1979 | Hoo . |
| 4,266,784 | 5/1981 | Torrington . |
| 4,316,539 | 2/1982 | Torrington . |
| 4,379,507 | 4/1983 | Llabrès . |
| 4,387,802 | 6/1983 | Shearing et al. . |
| 4,411,360 | 10/1983 | Gardineer, Jr. et al. . |
| 4,428,014 | 1/1984 | Saito . |
| 4,453,631 | 6/1984 | Mark . |
| 4,463,849 | 8/1984 | Prusak et al. . |
| 4,463,850 | 8/1984 | Gorog . |
| 4,476,978 | 10/1984 | Saito . |
| 4,535,888 | 8/1985 | Nusselder . |

(List continued on next page.)

FOREIGN PATENT DOCUMENTS

| | | |
|---|---|---|
| 1201203 | 2/1986 | Canada . |
| 0035933 | 9/1981 | European Pat. Off. . |
| 0157056 | 10/1985 | European Pat. Off. . |
| 0181835 | 5/1986 | European Pat. Off. . |
| 0212377 | 3/1987 | European Pat. Off. . |
| 3414903 | 10/1985 | Germany . |
| 3610623 | 10/1987 | Germany . |
| 21009 | 9/1907 | United Kingdom . |
| 2064486 | 6/1981 | United Kingdom . |
| 2147262 | 5/1985 | United Kingdom . |
| 2181038 | 4/1987 | United Kingdom . |
| 2184426 | 6/1987 | United Kingdom . |
| WO 86/07182 | 12/1986 | WIPO . |
| WO 87/05884 | 10/1987 | WIPO . |

*Primary Examiner*—Bryon P. Gehman
*Attorney, Agent, or Firm*—Darby & Darby

[57] ABSTRACT

A storage container comprising an outer shell and an insertable drawer member configured and dimensioned for receiving and storing information-bearing discs and accompanying printed matter. The insertable drawer member includes features to store the discs by contacting non-information bearing surfaces thereof as well as means for selectively retrieving the printed matter together with the disc from the outer shell. The drawer includes a top segment and a bottom segment that are hinged together. The bottom segment has outwardly extending flexible side walls with respect to the bottom segment.

25 Claims, 12 Drawing Sheets

U.S. PATENT DOCUMENTS

| | | |
|---|---|---|
| 4,617,655 | 10/1986 | Aldenhoven . |
| 4,620,630 | 11/1986 | Moss . |
| 4,623,062 | 11/1986 | Chase et al. . |
| 4,635,792 | 1/1987 | Yamada . |
| 4,640,413 | 2/1987 | Kaplan et al. . |
| 4,664,261 | 5/1987 | Frodelius . |
| 4,694,954 | 9/1987 | Moss . |
| 4,694,957 | 9/1987 | Ackeret . |
| 4,702,369 | 10/1987 | Philosophe . |
| 4,709,812 | 12/1987 | Kosterka . |
| 4,722,439 | 2/1988 | Grobecker et al. . |
| 4,726,615 | 2/1988 | Goldberg . |
| 4,728,157 | 3/1988 | David, Jr. . |
| 4,760,507 | 7/1988 | Ackeret . |
| 4,771,883 | 9/1988 | Herr et al. . |
| 4,881,640 | 11/1989 | Herr et al. . |
| 4,899,875 | 2/1990 | Herr et al. . |
| 4,905,217 | 2/1990 | King et al. . |
| 4,940,142 | 7/1990 | Behrens et al. . |
| 4,971,195 | 11/1990 | Mitsuyama . |
| 5,088,859 | 2/1992 | Mahler . |
| 5,188,230 | 2/1993 | O'Brien et al. . |
| 5,219,090 | 6/1993 | Vollmann . |
| 5,383,554 | 1/1995 | Cowan . |
| 5,445,265 | 8/1995 | Herr et al. ............... 206/308.1 |

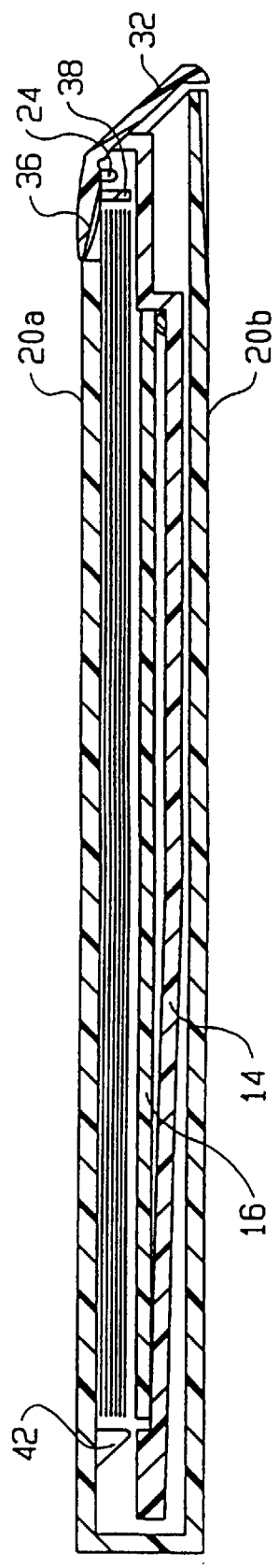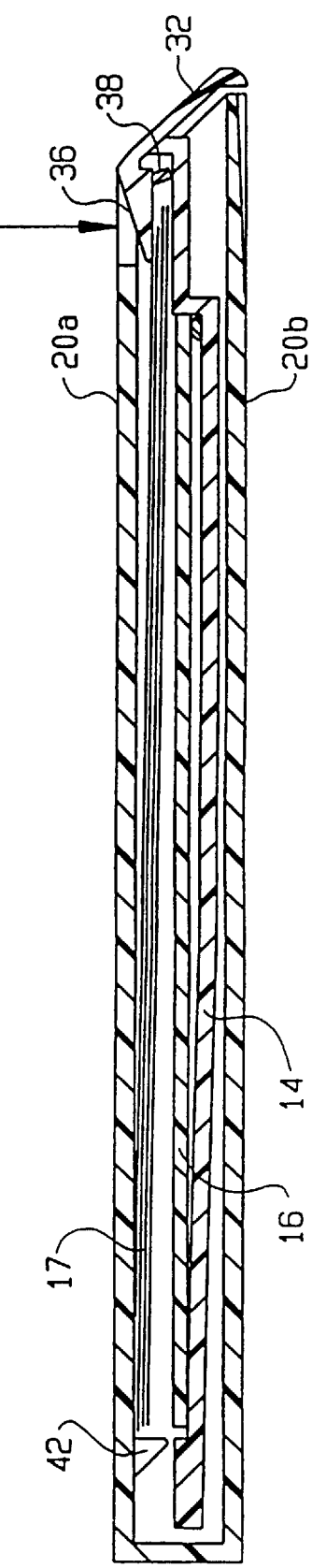

FIG. 12
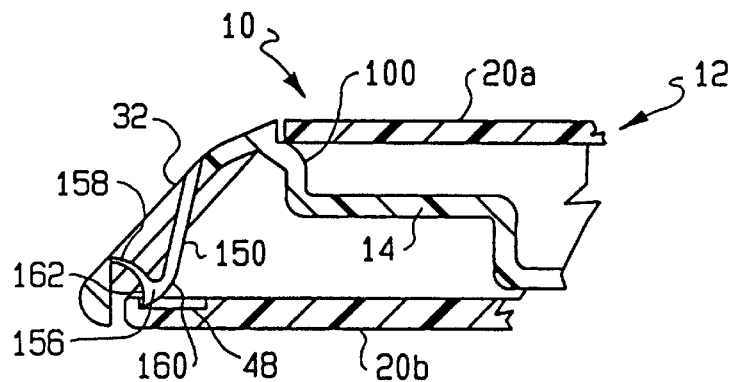
FIG. 13
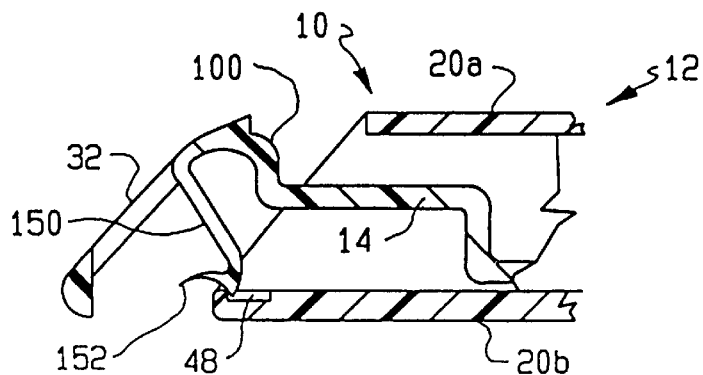
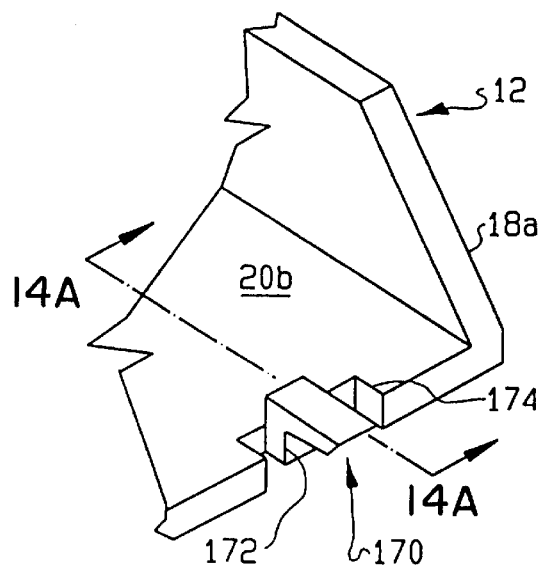
FIG. 14

STORAGE CONTAINER FOR INFORMATION-BEARING DISC DEVICES

TECHNICAL FIELD

The invention relates to storage containers for information-bearing disc devices, such as compact discs ("CDs"), compact disc, read-only-memory ("CD-ROM") devices and video laserdiscs as well as for the printed instructional or advertising matter provided with such discs. The invention additionally relates to seal means formed integral with such containers to enable an observer to determine whether the container contents have been accessed.

BACKGROUND OF THE INVENTION

Compact discs were originally designed as a storage and reproduction medium for digitalized music programs. CD-ROMs, on the other hand, are utilized for storing text and graphics, as well as for audio information. Discs created for these purposes have a plastic-coated, aluminized reflective surface containing digitalized information on one side thereof.

In order to access the program encoded upon, for example, an audio CD, an infrared beam from a semiconductor laser is focused upon the information-bearing surface through a series of lenses and prisms. The laser light which strikes the surface is then converted into a digital electronic signal. The resultant signal is then decoded and fed through an electronic filter, converting it from digital form into an analog signal suitable for any hi-fi amplifier.

A protective plastic coating on the surface of information-bearing discs of the type described herein prevents dust or debris from reaching the underlying reflective metal surface. Scratches or blemishes in the protective coating can thus interfere with the laser light beam.

One common cause of such damaging scratches is the removal or insertion of such information-bearing disc devices from or into, respectively, a molded plastic storage case of the type commonly used to hold such discs. Presently, the most common type of container utilized for this purpose is the well known "jewel box" case (hereinafter referred to simply as the "jewel box"), so-called due to the hinged manner in which it is opened. The jewel box is described, for example, in International Publication No. WO 86/07182. However, the jewel box is difficult to manipulate and contains many sharp edges which can scratch or gouge the information-bearing surface of the disc if a disc is carelessly handled, resulting in a loss of some or all of the information contained thereon.

Improved storage containers capable of enhanced protection of the outer, information-bearing surface on such disc devices are disclosed in U.S. Pat. Nos. 4,771,883, 4,881,640 and 4,899,875 to Herr et al. These references describe plastic storage containers of a type comprising a slidable drawer member dimensioned and configured to receive and store information-bearing discs within an outer shell in a manner that significantly diminishes the chance of scraping or otherwise damaging the information-bearing surfaces of the disc.

Further to the above, however, a booklet containing advertising and/or informational matter concerning the contents of the disc, sometimes including photographs and/or drawings, is typically included in the storage container with the disc. This material, referred to herein as "printed matter" may, for example, describe or illustrate the musical or informational contents encoded upon the disc, provide song titles or information about the recording artist, set forth the lyrics of the songs recorded thereon, or provide instructions on how to access the material upon, e.g., a CD-ROM.

The prior art jewel box typically stores such booklets adjacent the inner front panel of the container where they are held in place by several positioning tabs molded integrally upon the inner surface of the front panel. When the jewel box is opened to retrieve the disc, the booklet thus remains secured against the inner surface of the front panel by the tabs. To retrieve the booklet, the user must slide or bend the printed matter out from under the tabs. This operation tends to be rather awkward and often causes damage, i.e., bending, tearing, etc., to the booklet. The storage containers disclosed in U.S. Pat. Nos. 4,771,883, 4,881,640 and 4,899,875, while providing, as discussed above, enhanced protection against damage to the information-bearing surface of the disc, also provide a somewhat more "user friendly" means for accessing the printed matter, but these containers do not, however, entirely resolve the difficulties involved in obtaining access to the printed matter stored within the housing.

Another important consideration with regard to the packaging for information-bearing discs of the type described herein concerns "pirating" of the copyrighted material encoded onto the disc. This activity is commonly engaged in by consumers who, after purchase, open the package and copy the recorded material from the disc to a different medium, e.g., a cassette. Such individuals thereafter return the devices to the retailer for a refund of the purchase price claiming the disc is a duplicate of one they already own or is undesirable for some other reason.

To prevent such pirating, while still permitting the public to rightfully return undesired discs, many wholesalers utilizing the jewel box presently apply so-called "tamper seals", around the outer surfaces of the container. One commonly used tamper seal is a mylar strip which wraps around the edges of the container that are opened to access the disc. The strip is therefore typically broken or removed in order to access the disc. The idea is that retailers can accept returned discs in which the seal has not been broken or removed in the belief that the material was not copied. Such seals can be bypassed, however, by prying open the hinged side of the jewel box, thus permitting access to the disc contained therein without damaging or removing the seal. In addition, these strips are expensive in terms of the material and labor required to apply them to the container. Further, they are difficult to remove and thus provide an annoying obstacle to the average consumer who seeks access to the package contents for solely legitimate purposes.

SUMMARY OF THE INVENTION

The present invention thus relates to a novel container for storing and securing information bearing disc devices such as CDs, CD-ROMs, video laserdiscs and the like, as well as the printed matter that commonly accompanies such discs, which overcomes the disadvantages of the prior art packaging discussed above.

The container of the invention generally comprises an outer plastic housing or shell containing a slideable drawer member. The drawer may be partially removed from the shell by sliding it outwardly to selectively access the disc and/or the printed material. The drawer is configured and adapted for securing a disc of the type described above during periods of non-use and includes means for selectively retrieving the printed matter from the shell. The storage container of the invention additionally includes an integral tamper seal which evidences the first opening of the container without the drawbacks of the mylar strips discussed above.

The storage container of the invention can be configured in a variety of ways to achieve the purposes noted above. Several different embodiments of the invention are thus described herein for illustrative purposes, but the invention should not be limited to these particular combinations of features as one of ordinary skill in the art would immediately recognize that various additional combinations and permutations of the features described herein are possible.

Generally speaking, however, the container comprises an outer shell preferably formed of a molded thermoplastic, such as polystyrene, containing a slideable drawer member adapted for reciprocal movement into and out of the shell. A portion of the drawer member remains at all times at least partially secured within the shell by means described below. The drawer member is also preferably formed from a thermoplastic, e.g., polypropylene and is provided with means for removably securing the disc thereto without damage to the information-bearing surface thereof. While, as noted above, the preferred material for forming both the drawer and the shell is a thermoplastic, one of ordinary skill in the art would realize that these elements could, of course, be constructed of other materials., particularly other types of plastics, heavy paper (e.g., cardboard) and the like.

The container of the invention additionally comprises means for providing selective access to printed matter, i.e., information booklets, contained with the disc device. With the assistance of such access means, the user may, simply and conveniently at his or her option, access either the disc alone or the disc together with the printed matter (i.e., selective access) by a relatively simple manual manipulation of any one of several embodiments of the container lid as described herein.

The outer plastic shell of applicants' storage container remains substantively unchanged throughout each embodiment disclosed herein. The shell is generally constructed of a front panel member (also referred to herein as the "closure") and a rear panel member, oppositely disposed to the closure, and two opposed side members, with the panel members and side members being joined together at a bottom member to form a generally rectangular box-like structure having an open upper end at the "top" of the shell, i.e., the end opposite the bottom member.

The shell is provided with a retaining lip above the upper edge of the printed matter. This lip extends into the interior of the shell along the inner surface of the closure for preventing unwanted upward sliding movement of the printed matter from the outer shell when the consumer elects to access only the disc and not the printed matter as well. Thus, the retaining lip functions as a means for retaining the printed matter within the outer shell unless selectively accessed by printed matter removal means as described below.

The front panel member, i.e., the closure, of the shell is formed with an open "cut-out" space, preferably rectangular in shape, along the upper edge portion of the panel. This cut-out is configured and adapted to permit passage of at least a portion of a flange means associated with a lid portion of the drawer member for accessing the printed matter as described below.

The shell is additionally provided with means for securing a bottom portion of the drawer member therein when the container is opened in order to access the disc or the printed matter. This securement is effected by flexible wall members located along the lower lateral sides of the bottom segment of the drawer member. Each flexible wall member engages a corresponding stop member extending inwardly from the adjacent side wall of the shell. These stop members prevent the drawer from traveling any further distance out of the shell while yet providing unencumbered access to the disc. The flexible wall members, moreover, serve a dual purpose in that they also center the drawer within the shell.

The drawer member of the invention is divided by a flexible "living hinge" into top and bottom segments, each of which comprises approximately ½ of the length of the drawer member. Living hinges are well known in the art. They comprise a thin, flexible web of plastic which interconnects the two segments of the drawer, thus permitting rotational movement of the top drawer segment relative to the bottom segment.

The "top" segment of the drawer, as this term is used herein, is that portion above the living hinge which extends beyond the upper edge of the outer shell when the drawer is slid outwardly therefrom. Once the drawer is pulled from the shell, the top segment can be rotated in a clockwise direction about 0°–180° degrees around the living hinge. This exposes the upper half of the disc and permits the disc to be easily gripped by the consumer, e.g., by inserting one or more fingers through the hole in the center of the disc or by grasping the outer edge of the disc and lifting upwardly. The "bottom" segment of the drawer, as that term is used herein, is that portion of the drawer, below the living hinge, which remains within the shell when the drawer member is slid outwardly from the shell.

The top and bottom segments of the drawer member are essentially coplanar along the living hinge when the container is closed and provide a secure support for non-information bearing surfaces, i.e., the outer peripheral edges, of the disc. In order to ensure that the inner, information-bearing surface of the disc is not caused to ride across any sharp, potentially damaging surfaces upon entry to or removal from the container, the lower segment of the drawer member includes a semicircular "disc capturing" portion which is configured in the shape of a very shallow cone or funnel, i.e., a semicone, so that only the outer peripheral areas of the disc actually make contact with the drawer member. The drawer top segment includes a plurality of tab members for supporting the upper peripheral, i.e., non-information bearing, surfaces of the disc.

In addition, the bottom segment of the drawer is additionally provided with "floating" flexible fingers. As disclosed in U.S. Pat. Nos. 4,771,883, 4,881,640 and 4,899,875 issued to the inventors of the present invention, these fingers direct the disc edge into the disc capturing portion of the drawer, while ensuring that the printed matter provided with the disc is directed to a location within the container in abutting relation to the inner surface of the shell closure member and does not accidentally become seated in the area reserved for the disc. The entire disclosure of these patents is specifically incorporated herein by reference.

While the purpose of the drawer member in each embodiment of the invention described herein is essentially the same, i.e., to secure and selectively access an information-bearing disc and its accompanying printed matter and to provide, through an integral tamper seal, evidence of post-sale consumer access to the interior of the container, the embodiments of the drawer members for use in the container of the present invention described herein include a variety of specific features adapted for achieving the intended results.

Thus, each of the embodiments described herein achieves the desired function in a slightly different manner.

The first embodiment of applicants' invention further includes, in addition to the features noted above, a lid portion formed along the upper edge of the drawer member top segment, which lid is configured and adapted for closing the open end of the shell when the drawer is fully inserted therein. In the subject embodiment, when the drawer member is inserted into the shell, a flexible flange member extending from a front face of the lid extends over the cut-out formed in the upper portion of the shell closure such that the upper surface of the flange is coplanar with the outer surface of the closure. The flange and the corresponding cut-out preferably extend from the top, i.e., open, end of the shell downwardly to a point below the retaining lip on the inner surface of the closure. When it is desired to access the printed matter, the flexible flange member is pressed downwardly through the cut-out portion of the closure by the user's finger so as to compress the printed matter sufficiently to permit it to pass under the retaining lip. Alternatively, if only the disc is desired, the flange is simply not depressed when withdrawing the drawer member from the shell. Thus, the printed matter is not extracted from the shell unless the user specifically takes steps to do so.

The flange member may additionally include means for slideably positioning the printed matter back down within the shell after the user is finished with it. This positioning means comprises a wall member formed integral with the flexible flange member, directly above the upper edge of the printed matter, on the drawer lid and extending substantially perpendicularly toward the drawer member. This perpendicular wall contacts the printed matter along the top edge thereof when closing the storage container and thus serves to push the printed matter down into the shell until the printed matter reaches a predetermined location against the inner surface of the housing determined by lower stop tabs formed integral with and extending substantially perpendicularly from the inner surface of the shell closure.

In a second embodiment of the invention, the printed matter is retrieved from the shell utilizing an L shaped flange on the lid of the drawer member. A first portion of this flange extends from the lower lateral front edge of the lid out over the cut out in the shell closure and thus over the printed matter seated behind the shell closure. The second portion of the flange comprises a lever member extending perpendicularly from the upper end, i.e., the end proximate the lid, of the first flange portion toward the rear of the container. This perpendicular lever is of a length sufficient to permit access by the user's fingers to the free end thereof at the back of the drawer lid. With the user's hand wrapped over the shell lid, both the first and second flange portions are accessible to the user's fingers.

The printed matter is therefore retrieved in the subject embodiment by pulling upwardly, i.e., in a counterclockwise direction, on the lever member at the rear of the lid, thus causing the first flange portion to rotate downwardly through the cut-out in the closure and toward the printed matter. The printed matter is thus compressed and secured between the first portion of the L-shaped flange and the drawer member such that, upon moving the drawer upwardly out of the shell, the printed matter follows with the drawer and can thus be removed from the shell.

In another embodiment of the invention, the printed matter retrieving means is comprised of a flange extending from the lid of the drawer member and parallel to the front face thereof. In a preferred version of this embodiment, the flange extends across substantially the entire width of the lid. Thus, in the preferred embodiment, the cut-out extends completely across the entire width of the shell upper edge. When the storage container is closed, the flange extends from the lid over the cut out in the shell closure, and thus over the printed matter behind the cut-out. The flange, or a portion thereof, is pliable in that it has a thickness reduced in comparison to that of the remainder of the flange. The pliable portion of the flange is depressed downwardly by the user's finger against the printed matter and thus compresses and grips the printed material between the pliable portion and the drawer member. This enables the printed matter to be selectively extracted from the shell with the drawer.

In a still further embodiment of the present invention, the printed matter is extracted from the shell by a scissor-like action between dual flange members cooperatively associated with the lid portion of the drawer member. A first flange member extends from the drawer member lid, parallel to the front face thereof, over the cut-out in the shell closure. A second flange member extends from the inner surface of the lid to a position behind the printed matter and directly below the first flange. The second flange is attached to the lid at a pivot point. The second flange further includes a lever member formed integral with and extending substantially perpendicularly from the pivot point into a space behind the lid. The lever member is thus pushed in a clockwise direction by the user when extracting the drawer member from the shell to cause the second flange member to rotate about the pivot point toward the first flange, thus clamping the printed material between the first flange and the second flange, whereupon it is removed from the shell along with the disc.

The storage containers described herein additionally comprise tamper seals formed integral with the container which, once broken, provide visual evidence that the container has been opened to access its contents. In a first embodiment, the seal is comprised of a plastic finger member connected at one end of the finger to the lid of the drawer via a living hinge. The free end of the finger engages a groove in the inner surface of the rear shell panel. The finger member is further attached at a second location therealong to the lid via a narrow plastic filament. When the drawer member is removed from the shell for the first time, the finger member contacts the edge of the groove, causing the finger member to rotate about the living hinge and thus breaking the filament attachment.

In another embodiment, the finger member is attached to the drawer lid via a living hinge, a thin web and a leaf spring member. In this embodiment, the finger extends from the living hinge to contact a groove in the rear shell panel. When the drawer member is extracted from the shell, the finger contacts the edge of the groove, causing the finger to rotate about the living hinge and break the web connection. After the web connection is broken, the leaf spring flexes to maintain the finger member in the rotated position.

In yet another embodiment, the seal is comprised of a tab member affixed to the inner surface of the rear panel of the shell via a breakable joint. The tab member includes a first surface abutting against the drawer member such that when the drawer member is removed from the shell, the tab member breaks away from the rear planar surface due to the force exerted on the first surface by the drawer member.

In still another embodiment, the drawer member has an aperture in its base, across which is stretched a narrow filament. The corresponding portion of the shell directly below the aperture includes a ramp extending from the inner surface of the rear panel. The filament is severed by the ramp when the drawer member is extracted from the shell.

The present invention also relates to an improved storage container that permits substantially unrestricted access to an information bearing disc and/or printed matter stored therein when a plurality of such storage containers are stacked, either one atop the other, or within a storage unit, e.g., a cabinet adapted to contain a plurality of such containers. When the prior art "jewel box" disc container is stacked, one must remove the entire storage container from the stack to access the disc and/or printed matter contained therein. In contrast, the present invention is directed to a disc storage container that allows the user to access the disc as explained below without removing the container from the stack. This result is achieved by pulling the drawer outwardly from the top of the storage container along the side of the stack and rotating the drawer top segment downwardly away from the under surface of the disc.

As described above, the storage container of the invention is comprised of a drawer member that is slideably retained within an outer shell. The drawer member is comprised of a lid portion that is attached to the drawer top segment, which substantially closes the outer shell top end when the drawer member is stored in the shell. This top end is accessible to the user's fingers when the storage containers of the invention are stacked. To facilitate manipulation of the drawer member by the user, the lid portion of the drawer is angled, i.e., slanted from the perpendicular. This angled lid provides consumers ready access to the lid of a particular storage container within a stack of the same whereupon the lid may be withdrawn from the outer shell without substantial interference from any of the surrounding containers. Moreover, once the drawer is opened, the top segment thereof can be readily rotated downwardly, away from the disc, without interference from the lid portion of the next lower container in the stack.

Preferably, the lid portion is oriented for this purpose at an angle of approximately 45 degrees to the plane of the outer shell front face, although as would be well understood by one of ordinary skill in the art any other angle which permits ready gripping of the container lid portion could also be used. Moreover, instead of an angled lid having a flat planar surface, the lid may instead be molded into some other geometric shape adapted to facilitate gripping by the user's finger without interfering with the movement of the drawer top portion as it is rotated away from the disc, e.g., a crescent or half-moon shape, or some other shape. Additionally, a gripping edge can be provided along the underside of the lid portion to provide additional purchase for the user's fingers. In a still further embodiment, a ramped surface is provided along the outer surface of the shell rear face to make it easier for users to slide their fingers behind the lid portion, thus further facilitating access to the drawer member.

BRIEF DESCRIPTION OF THE DRAWINGS

FIG. 4 is a sectional view taken along the line 4—4 of FIG. 1;

FIG. 4A is a view similar to that of FIG. 4 illustrating one means by which the printed matter is extracted from the storage container;

FIG. 12 is a partial sectional view taken along the line a—a of FIG. 11 with the storage container in the closed position;

FIG. 13 is a partial sectional view taken along the line b—b of FIG. 11 as the drawer member is being pulled outwardly from the shell;

FIG. 14 is a partial perspective view of a storage container of the invention incorporating an alternate tamper seal embodiment;

DETAILED DESCRIPTION OF THE PREFERRED EMBODIMENTS

Figure 1:
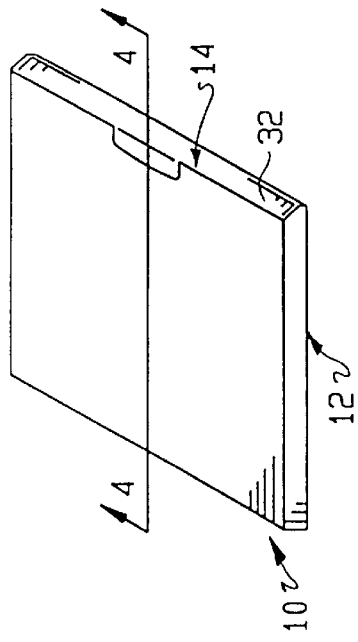
FIG. 1 is a perspective view of a first embodiment (Embodiment "A") of a storage container constructed according to the present invention.
Figure 3:
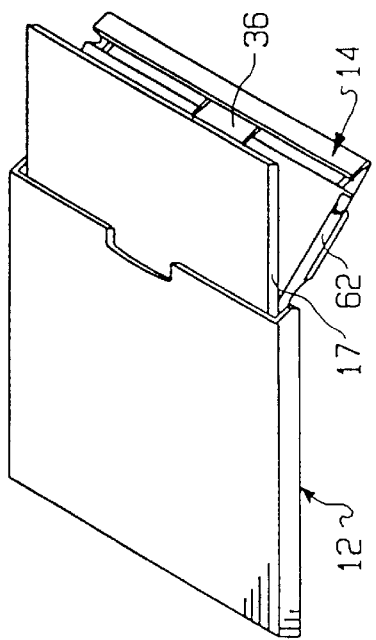
FIG. 3 is a perspective view of the partially-opened storage container of FIG. 1.
Figure 2:
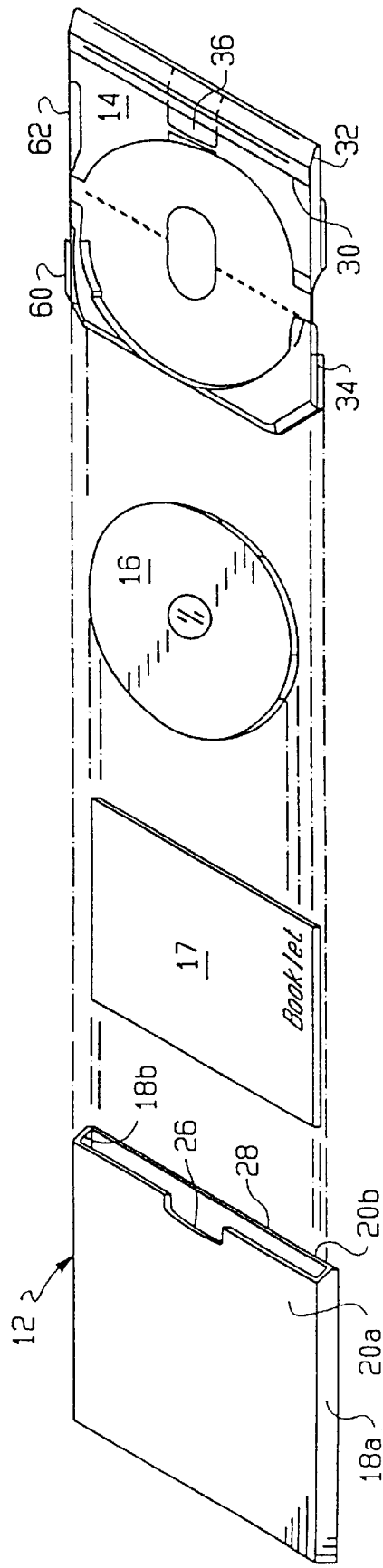
FIG. 2 is an exploded perspective view of embodiment A shown in FIG. 1.

Referring initially to FIGS. 1, 2 and 3, there is illustrated a first embodiment "A" of the novel storage container 10 of the invention. Storage container 10 comprises an outer plastic shell 12 within which is slideably engaged an insertable drawer member 14 (referred to herein as the "drawer"). The storage container 10 is configured and designed for storing and selectively accessing an information-bearing disc 16 alone or together with printed matter 17, typically provided therewith.

As used herein, the terms "top" and "upper" refer to the end of the storage container or a component thereof opposite bottom member 22. Alternatively, "bottom" and "lower" refers to the end, i.e., of the shell or the drawer, adjacent the bottom member 22. The term "front" is used herein to refer to that portion of the container adjacent the closure whereas the "rear" of the container is that portion behind the drawer, including the back of the lid portion.

FIG. 1 illustrates container 10 in the storage mode, i.e., as it appears in its closed configuration. The drawer 14 is substantially enclosed within the shell 12 (except for lid portion 32 described below) along with the disc 16 and the printed matter 17 (not shown). Shell 12 is preferably molded of a non-opaque thermoplastic composition to permit the retail customer to visually observe its contents. The drawer 14 includes a lid portion 32 along its upper edge which contacts an open end of shell 12 to completely enclose disc 16 and printed matter 17.

The spatial interrelation among the contents of storage container 10 in FIG. 1 are shown in FIG. 2. Shell 12, preferably formed, as described above, of a molded thermoplastic, e.g., polystyrene, comprises closure 20*a* positioned directly above printed matter 17, rear panel 20*b* behind the drawer 14 and side panel members 18*a*, 18*b*, all of which are co-joined at bottom member 22 (shown in FIG. 5). Thus, the upper open end of shell 12 opposite bottom member 22 permits insertion and removal of drawer 18. This open end is sealed by lid 32 when drawer 14 is closed. Closure 20*a* defines a cut-out portion 26, preferably rectangular in shape, along its upper edge. The function of this cut-out 26 is as described below.

As noted above, drawer 14 is configured to contact only the non-information bearing surfaces of disc 16 when the disc is received or removed. Extending downwardly from lid 32 and parallel to the front face thereof is a flexible flange member 36 which is adapted to pivot through the cut out 26 in closure 20*a* upon the application of a downward force thereon by the user's finger when the drawer member 14 is fully inserted into the shell 12.

Further to the above, formed integral with and extending laterally at approximately a 45° angle from the lower left and right sides of drawer 14 are flexible side wall members 34. When the drawer 14 is positioned within the shell 12, the side wall members 34 extend from the drawer 14 to contact the interior of the panel members 18*a*, 18*b*, 20*a* and 20*b* which form shell 12 to position the drawer within the shell and to prevent (in a manner described below) drawer 14 from sliding out of shell 12 during the removal of disc 16 or in the event that the container 10 is turned upside down.

FIG. 3 illustrates container 10 of the invention where drawer 14 is pulled outwardly from the top of shell 12 and top segment 62 of drawer 14 is rotated in a clockwise direction to expose the printed matter 17 (and disc 16 which is hidden by printed matter 17) to permit their removal from shell 12 by the consumer. The "top" segment 62 of the drawer 14 as that term is used herein (see, e.g., the discussion of FIG. 7 below) is thus the upper portion of the drawer to which lid 32 is attached and which is capable of rotational movement away from disc 16 around a living hinge as described below. The segment of the drawer 14 that remains substantially within the shell 12 is thus referred to herein as the "bottom" segment 60.

Referring now to FIGS. 4 and 4A, the disc 16 and printed matter 17 are shown enclosed within the storage container 10. The disc 16 is secured upon the drawer 14 only along its non-information bearing surfaces, i.e., along the outer edge of the disc, such that when the drawer 14 is removed from the shell 12, disc 16 travels upwardly out of the shell with the drawer. The printed matter 17 is interposed between the disc 16 and the shell closure 20*a*. When the drawer 14 is pulled outwardly from the shell 12 any upward, i.e., out of the shell, sliding movement of the printed matter 17 is stopped when an upper edge of the printed matter 17 contacts retaining lip or booklet retention nub 24 projecting inwardly from the inner surface of the closure 20*a* (see FIG. 5B) at approximately the upper end 28 thereof.

As shown in FIG. 4A, for removal, the printed matter 17 is compressed by a force F exerted on the flexible flange member 36 by the user's finger which permits matter 17 to slide under the retaining lip 24 when drawer 14 is withdrawn from the shell 12. The printed matter is gripped between the flange member 36 and drawer 14 so that it can be removed from the shell 12 with the drawer 14. Thus, to selectively access the printed matter 17 with the disc 16, the user. applies force F on the flexible flange 36 when withdrawing the drawer 14 from the shell 12. Alternatively, if only the disc 16 is desired, the drawer 14 can be pulled from the outer shell 12 without squeezing flange 36. Then the printed matter 17 remains in place below lip 24 when the container 10 is opened.

Figure 5:
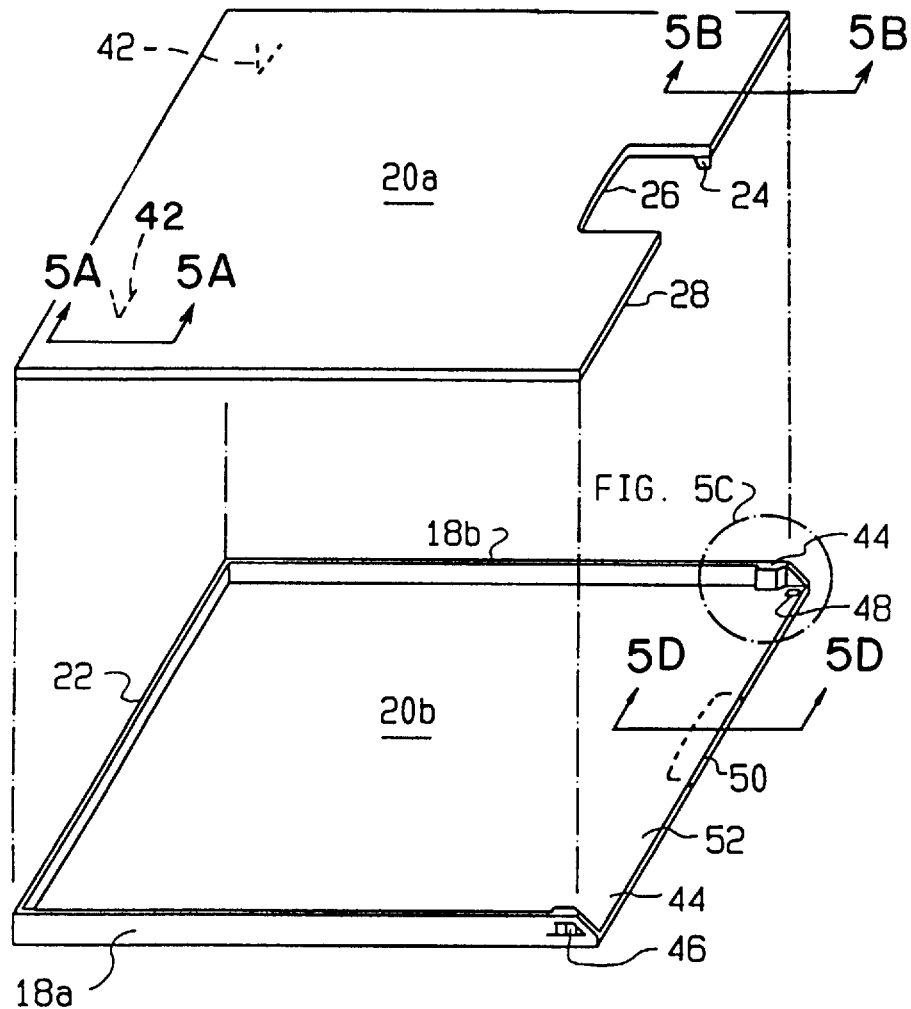
FIG. 5 is an exploded view of the container shell.

FIG. 5 illustrates the structure of shell 12. As stated previously, the shell 12 comprises rear panel 10 20*b*, front panel, i.e., closure, 20*a*, two opposing side walls 18*a* and 18*b* and a shell bottom wall 22, all preferably formed of a molded thermoplastic. The closure 20*a* is separately molded from the remainder of the shell 12 and is preferably secured in place by a process such as solvent welding or ultrasonic bonding.

Closure 20*a* defines a cut-out portion 26, along its upper edge 28 which is preferably U-shaped to correspond to the size and shape of flange 36 on lid 32. One of ordinary skill in the art would readily realize, however, that both cut-out 26 and flange 36 may be formed in a variety of shapes, so long as flange 36 is of a size and shape which enables it to be pivoted through cut-out 26. As also illustrated in FIG. 5, extending inwardly along the top end 28 of closure 20*a* is retaining lip 24. Lip 24 preferably extends from the left and right lateral edges of the cut-out 26, along the front face top edge 28 toward side walls 18*a* and 18*b*. The cut-out 26 extends downwardly from the top end 28 of closure 20*a* to a point below the lip 24 such that the flexible flange member 36 (shown in FIGS. 1–4) can extend beyond the lip 24 to compress printed matter 17 sufficiently to permit it to pass thereunder.

Figure 5A:
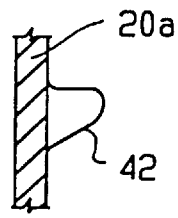
FIG. 5A is a partial sectional view taken along the line a—a of FIG. 5.
Figure 5B:
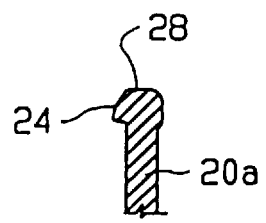
FIG. 5B is a partial sectional view taken along the line b—b of FIG. 5.

FIG. 5B illustrates the top edge 28 of shell front face 20*a* having lip 24 molded thereon. Lip 24 extends rearwardly into the interior of shell 12 just far enough to provide a stopping surface for retaining the printed matter 17 (see FIG. 4) within the shell 12 when flexible flange 36 is not depressed, yet not far enough to prohibit flexible flange 36 from compressing printed matter 17 under lip 24 to facilitate removal of the printed matter from shell 12 when flange 36 is forced downward by finger pressure exerted by the user (see, e.g., FIG. 4A).

Adjacent the lower end of the front face 20*a* near bottom member 22, tabs 42 extend from closure 20*a* into the interior of shell 12 to provide a lower stop for the printed matter 17 when the same is inserted into the container 10. As shown in FIGS. 4 and 5A, tabs 42 extend rearwardly from closure 20a to a point adjacent the face of the disc 16 to prevent any further downward progress of the printed matter. Moreover, as one of ordinary skill in the art would recognize, the shell bottom 22 can also serve as a stop for the printed matter 17 in cases where the printed matter 17 is oversized, i.e., longer than is normally found. Generally speaking, however, the distance between the lip 24 and the tabs 42 should be slightly greater than the length of the printed matter 17 such that the printed matter 17 can be readily retained therebetween.

The side walls 18a and 18b of the shell 12 are provided with stop members 44 protruding inwardly from the inner surfaces thereof at approximately the top edge 28 to provide abutting engagement with the corresponding flexible wall members 34 (see, e.g., FIGS. 2 and 6–7) of drawer 14 when the drawer 14 is pulled upwardly within shell 12.

Figure 5C:
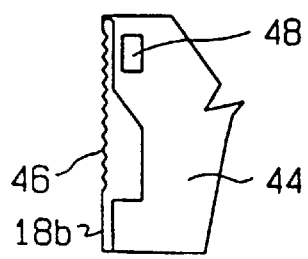
FIG. 5C is a enlarged perspective view of a portion of FIG. 5.

FIG. 5C is an enlarged top view of an upper corner portion of shell 12 which clearly illustrates one of the stop members 44 extending from the upper inner surface of shell side wall 18b.

Figure 5D:
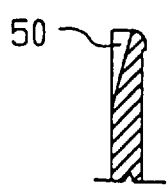
FIG. 5D is a partial sectional view taken along the line d—d in FIG. 5.
Figure 5E:
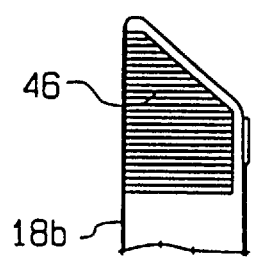
FIG. 5E is a partial side view of section c in FIG. 5.

FIGS. 5C and 5E further illustrate a series of serrations or corrugations 46 along the outside upper end of side wall members 18a and 18b for providing a gripping surface for the user when sliding drawer 14 outwardly from the top of shell 12.

Returning now to FIG. 5, the shell rear face 20b is shown to be longer from bottom to top than the closure 20a. This leaves a top portion 52 of the shell rear face 20b which extends upwardly beyond closure 20a. Top portion 52 contains groove 48 which is configured and adapted for engagement with a finger member 150 on drawer 14 (described below in the discussion of FIG. 12) which is utilized in forming tamper seal 86. Also along the top portion 52, on the outer surface of the rear face 20b, is a ramped surface 50 that enables users to slide their fingers behind lid 32 for extracting the drawer 14 from shell 12 to access the disc 16 and printed matter 17. FIG. 5D more clearly shows the ramped surface as a reduction in the thickness along the upper edge of face 20b.

Figure 6:
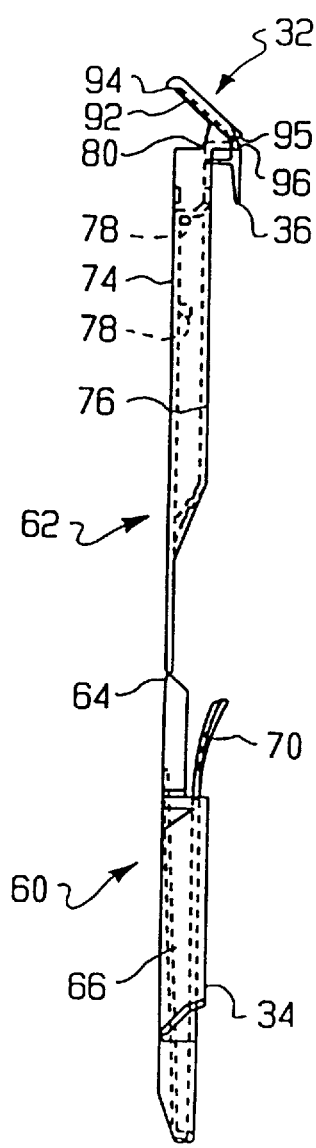
FIG. 6 is a side view of a drawer member constructed according to the present invention.
Figure 7:
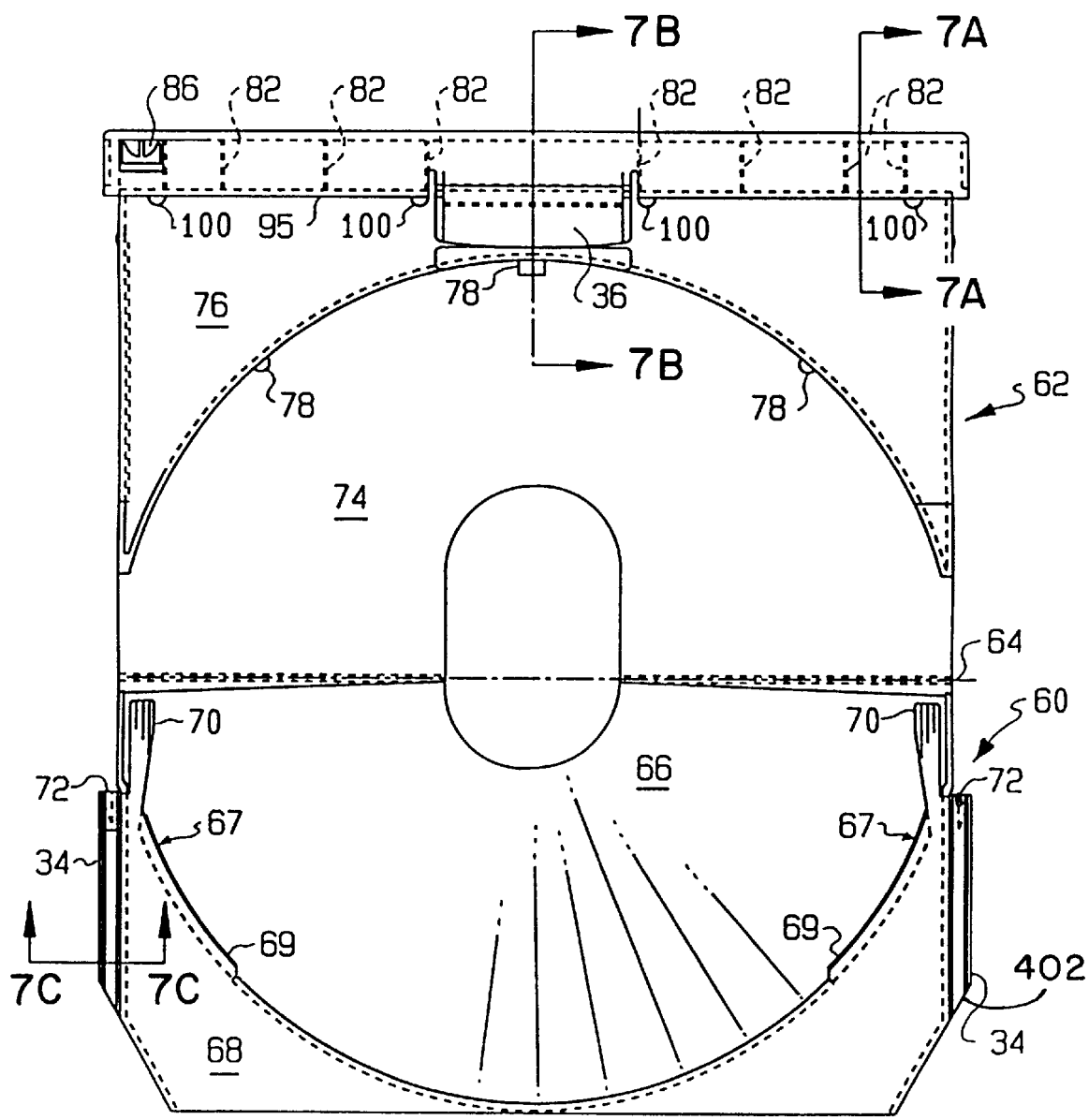
FIG. 7 is a top plan view of the drawer member of FIG. 6.

FIGS. 6 and 7 illustrate drawer 14. The drawer is preferably molded of a thermoplastic composition such as a polyolefin and is comprised generally of bottom segment 60 and top segment 62 connected by a living hinge 64. Living hinge 64 is a thin, flexible plastic web interconnecting segments 60 and 62. The flexibility of hinge 64 permits top segment 62 to be rotated in a clockwise direction with respect to bottom segment 60, from a first position which is essentially coplanar with bottom segment 60 to a second position at an angle of from about 0°–180° therefrom which exposes disc 16 and printed matter 17 (see FIG. 3).

The drawer member bottom segment 60 comprises base 66 and an arcuate disc seating surface 68 overlying at least a portion of base 66. Base 66 is configured as a very shallow semicone such that when the disc 16 is inserted towards disc seating surface 68, only the non-information bearing, i.e., outer peripheral edges of the disc 16 are actually contacted. In the preferred embodiment, the disc securing means comprises a plurality of arcuate flanges 69 extending outwardly from the disc seating surface 68 and parallel to base 66. A series of disc capturing grooves 67 are thus formed between the flanges 69 and base portion 66 to grip the disc 16 by contact relation along its peripheral surfaces.

Drawer bottom segment 60 further includes guide means 70 for directing disc 16 into disc capturing flanges 69 and the printed matter 17 into position adjacent closure 20a underneath lip 24. Guide means 70 is comprised of a pair of flexible, floating finger members 70. Fingers 70 are located along the left and right sides of lower drawer segment 60 adjacent the edges thereof, extending upwardly toward living hinge 64 from disc seating surface 68 in the direction of upper drawer segment 62. The fingers 70 are slightly curved such that when the drawer 14 is extended from the shell 12 to expose the drawer top portion 62, fingers 70 flex away from the drawer to guide the disc into the disc capturing grooves 67. Fingers 70 contact only the non-information bearing surfaces of disc 16 when guiding the disc into engagement with grooves 67.

The drawer bottom segment 60 further includes flexible side wall members 34 (discussed above with regard to FIG. 2) that extend outwardly at an angle of approximately 45° along the lower edges of bottom segment 60 to contact the side walls 18a and 18b of shell 12 near or at the connections with the front face 20a (not shown) so as to position drawer 14 within the shell. As drawer 14 is pulled from the shell 12 in order to access the disc 16 and printed matter 17, the upper ends 72 of flexible side walls 34 contact stop members 44 (shown in FIG. 5) on side walls 18a and 18b to prevent further outward motion of the drawer 14. Thus, the distance from the flexible side wall members 72 to the living hinge 64 must be equal to or greater than the distance from the stop member 44 bottom edge, which abuts the flexible side wall upper edge 72, to the top edge on the shell rear face 20b such that the drawer top segment 62 can rotate downwardly when the drawer 14 is partially extracted from the shell 12. The leading edge 402 of flexible wall 34 is bevelled to help guide the drawer 15 into the shell 12 (See FIG. 7).

The drawer top segment 62 comprises a base 74 and an arcuate surface 76 overlying an upper portion of base 74. The top segment 62 is configured and adapted such that neither base 74 nor surface 76 actually contacts the disc 16. Rather, a plurality of tab members 78 extend substantially perpendicularly from the surface 76 to provide a rest for the non-information bearing surface of disc 16 when the storage container 10 is closed.

Arcuate surface 76 further includes a plurality of tabs 100 which extend from surface 76 and contact the lip 24 of shell 12. Tabs 100 assist in positioning the top drawer segment 62 between the shell closure 20a and the shell rear face 20b when the storage container 10 is closed.

Lid 32 of drawer 14 is integrally attached to the drawer top portion 62 along edge 80 (see, e.g., FIG. 6). A plurality of ribs 82 facilitate the attachment of the lid to the drawer and provide structural support to the lid. The lid 32 is configured and adapted to close the open end of shell 12 when the storage container 10 is slid completely into the shell to totally enclose the disc 16 and printed matter 17. Preferably, the lid 32 is comprised of a relatively rectangular member 92 angled relative to shell faces 20a and 20b. Member 92 includes a gripping edge 94 located upon its underside and a top gripping edge 95 on its front outer surface. Flexible flange 36 extends from member 92 along edge 95 via a flex hinge 96. Lid 32 further includes a tamper seal 86 for providing an indication that the drawer 14 has been extracted from the shell 12. Seal 86 is discussed more fully below.

Figure 7A:
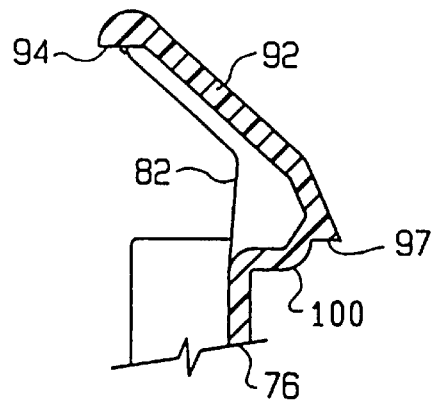
FIG. 7A is a partial sectional view taken along the line a—a in FIG. 7.

Turning now to FIG. 7A, lid 32 is generally formed, as noted above, of a rectangular member 92 having a gripping edge 94 on the rear surface and a top closing edge 97 configured and adapted to abut the shell closure 20a when drawer 14 is fully inserted. In addition, tabs 100 extend forward from the front surface 76 of the lid to abut the inner surface of the shell front face 20a against the shell lip 24 providing a secure fit therewith.

Figure 7B:
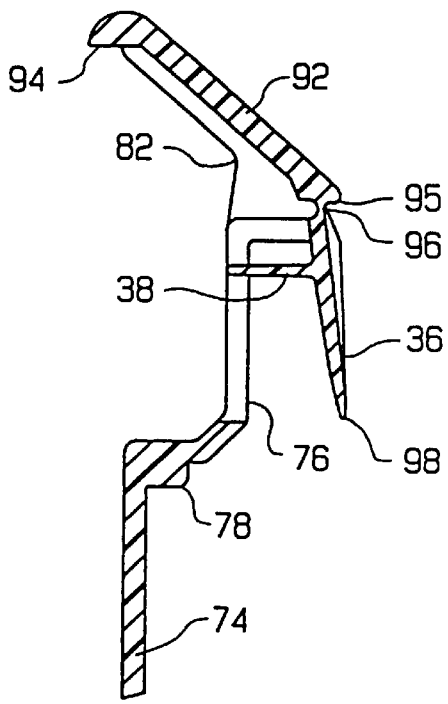
FIG. 7B is a partial sectional view taken along the line b—b in FIG. 7.

FIG. 7B more fully illustrates the flexible flange 36 on lid 32. Flange 36 is attached to angled member 92 at the top gripping edge 95 of member 92 via flex hinge 96. In the embodiment shown, the flexible flange 36 extends to tip portion 98 such that the outer surface of the flexible flange 36 is substantially level and parallel with the outer surface of the closure 20a. The under surface of flange 36 is tapered such that the flexible tip portion 98 is thinner than the shell front face 20a. In this manner, the flexible tip portion 98 is spaced from arcuate surface 76 on drawer 18 further than the shell closure 20a such that when the storage container 10 is closed, at least a rear surface of flexible flange member 36 will fit into the cut-out portion 26 of shell 12, extending over the upper edge of printed matter 17 behind cut-out 26.

Thus, as shown in FIGS. 4 and 4A, when a force F is exerted on the flexible flange 36, flange 36 rotates downwardly about flex hinge 96 toward arcuate surface 76 on drawer upper segment 62 to abut against the printed matter 17. The flange thus compresses printed matter 17 sufficiently to permit it to pass under lip 24 as drawer 14 is withdrawn from shell 12.

In a preferred embodiment of the invention, a member 38 extends inwardly toward the printed matter from the underside of the flexible flange 36 to push the printed matter downwardly into the shell beyond shell lip 24 when it is desired to replace the printed matter into the shell. As shown in FIG. 4, the surface of the member 38 abutting the printed matter top edge is configured and adapted such that the printed matter 17 is pushed below the shell closure lip 24 when the storage container 10 is fully closed. In an alternate embodiment, tab members 100 could also be utilized as means for forcing the printed matter 17 downwardly into the shell by configuring them to protrude from the drawer lid 32 to a point below the shell lip 24 when the container 10 is closed.

Shown in FIG. 7B are tab members 78 which extend from base 74 of drawer top segment 62 to contact the non-information bearing surface of the disc 16. Tab members 78 extend from base 74 to a level that is substantially parallel with the disc capturing grooves 67 on the bottom segment 60 of drawer 14.

Also illustrated in FIG. 7B is the gripping edge 94 on the rear surface of the drawer lid 32 as well as gripping edge 95 on the front surface of the drawer lid 32. The consumer's grip on back edge 94 is facilitated by ramped edge 50 (see FIG. 5D), whereupon the user's finger slides up the ramp to the gripping edge 94 which provides a surface upon which to apply a pulling force. Front gripping edge 95 similarly provides a gripping surface upon which a pulling force can be applied. Thus, to open the storage container 10 when access to printed matter 17 is not desired, the user simply grasps front gripping edge 95 and rear gripping edge 94 with one hand while holding the shell 12 with the other hand, preferably at serrations 46 (see FIG. 5E). The user thus simply pulls the drawer 14 and shell 12 apart from each other such that the drawer 14 slides from the shell 12 until the side walls 34 on lower drawer segment contact the stop members 44 on the inner surface of the shell side panels 18a,b such that the drawer top segment 62 is exposed and can be rotated in a clockwise direction away from disc 16. When access to the printed matter 17 is desired, the user simply applies a force F to the flexible flange member 36, thus gripping the printed matter 17 between the flange 36 and the drawer 14 and pulls the drawer 14 from the shell 12.

Figure 7C:
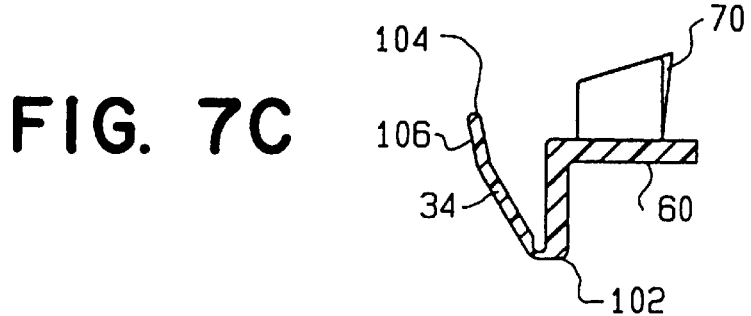
FIG. 7C is a partial sectional view taken along the line c—c in FIG. 7.

As shown in FIG. 7C, extending from each side of drawer bottom segment 60 is flexible finger 70 and flexible wall 34. As discussed above, finger 70 is angled away from drawer 14. The inner surface of finger 70 thus serves to guide the non-information bearing surface of the disc 16 into the disc capturing grooves 67. The flexible walls 34 extend rearwardly from rear edges 102 on drawer bottom segment 60 for contact with the shell rear face 20b. Flexible walls 34 also extend forward to front edges 104 at approximately a 45° angle so as to contact the shell closure 20a. Walls 34 are further configured and adapted with a flat surface 106 for contacting the shell side walls 18a and 18b. In this manner, walls 34 center the bottom segment 60 of the drawer member both laterally and longitudinally between the shell side walls 18a and 18b and between the shell closure 20a and the shell rear face 20b.

Figure 8:
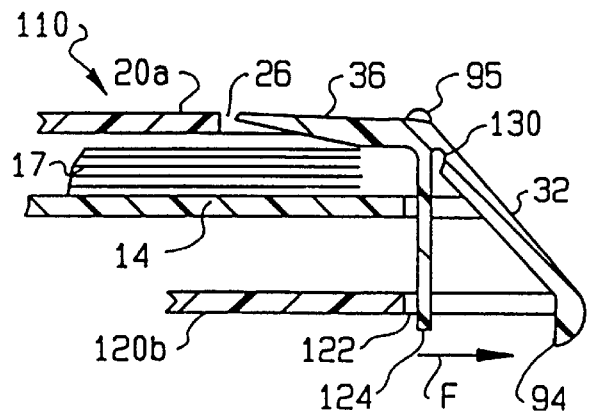
FIG. 8 is a partial sectional view of a second embodiment (Embodiment "B") of a storage container constructed according to the present invention.

FIG. 8 presents a second embodiment, B, of a storage container 110 according to the present invention. Components of this embodiment that are similar to or the same as the corresponding components of embodiment A described above will retain their identification numeral for consistency. In embodiment B, the storage container 110 includes a shell comprising closure 20a, side walls 18a and 18b and rear face 120b. The shell is closed, as in Embodiment A, by lid 32 on drawer 14. The shell rear face 120b defines an aperture 122 configured and adapted for receiving a lever 124 which extends therethrough and which is utilized as described below for retrieving the printed matter 17. Lever 124 is rigidly connected to flexible flange member 36 and extends substantially perpendicularly therefrom through aperture 122 so as to be accessible to the fingers of the user.

To retrieve the printed matter 17 from the storage container 110 of embodiment B, the user applies a counterclockwise (i.e., toward drawer lid 32) force F to lever 124, which causes the lever 124 and flexible flange member 36 formed integral therewith to rotate about flex hinge 130. As flexible flange 36 rotates, it compresses and grips the printed matter 17 between flange 36 and the drawer 14 such that the printed matter 17 may then be extracted from shell 12 along with the drawer 14. To retrieve the disc 16 without the printed matter 17, the user extracts the drawer member by simultaneously pulling on the back gripping edge 94 and the front gripping edge 95 without triggering lever 124. As with embodiment A, any motion of the printed matter 17 will otherwise stop when the printed matter 17 contacts the retaining lip 24 (not shown) upon closure 20a.

Figure 9:
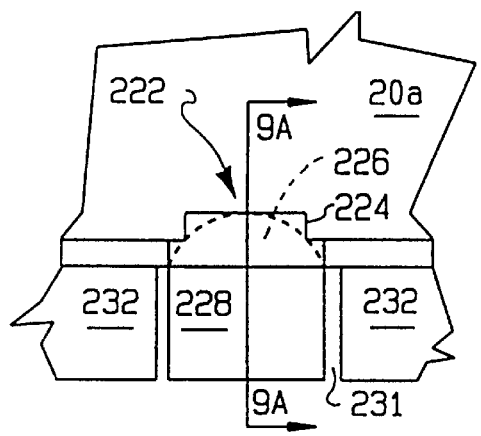
FIG. 9 is a partial perspective view of a third embodiment (Embodiment "C") of a storage container constructed according to the present invention.
Figure 9A:
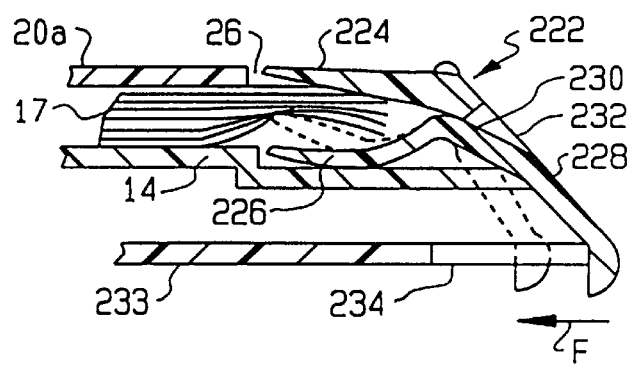
FIG. 9A is a partial sectional view of the storage container of FIG. 9.

FIG. 9 illustrates embodiment C of the storage container 210 according to the present invention. This embodiment retrieves the printed matter 17 with a pair of flanges having a scissor type grip. In embodiment C, the printed matter retrieval means 222 is comprised of a front flange 224 and a rear flange 226 which are adapted to grasp printed matter 17 with a scissor-like motion. Rigidly connected to rear flange 226 is a lever 228 which extends from flange 226 through an aperture 231 defined by drawer lid 232 to the rear of container 10. Rear flange 226 and lever 228 are connected to the drawer lid 232 at a pivot point 230. When the drawer 14 is inserted within the shell 12, the rear flange 226 slides behind the printed matter 17 while the front flange 224 slides in front thereof, directly above cut out 26 in closure 20a.

To retrieve the printed matter 17, the lever 228 is depressed by force F which causes it to rotate toward the drawer 14 and causes rear flange 226 to rotate forward such that printed matter 17 is compressed and gripped between front flange 224 and back flange 226. In this embodiment, closure 20a does not include a lip 24 for the retention of the printed matter 17 since the printed matter 17 is already compressed toward the shell closure 20a by rear flange 226. To retrieve the disc 16 without the printed matter 17, the user can extend the drawer 14 from the shell 12 by either pulling the drawer lid 233 or the lever 228.

The shell 12 in embodiment C, is comprised primarily of the shell front face 20a which includes cut-out 26 and a shell rear face 233 which defines aperture 234. Aperture 234 in rear face 232 provides a space into which lever 228 can rotate when depressed by a user.

Figure 10:
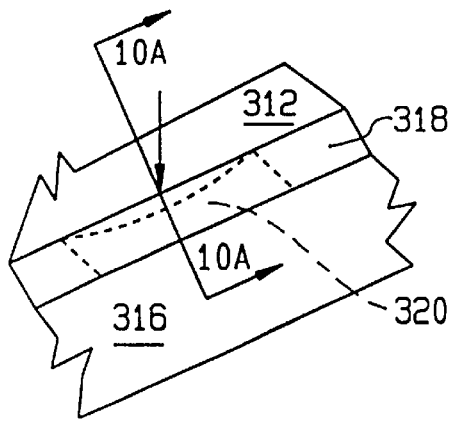
FIG. 10 is a partial perspective view of a fourth embodiment (Embodiment "D") of a storage container constructed according to the present invention.
Figure 10A:
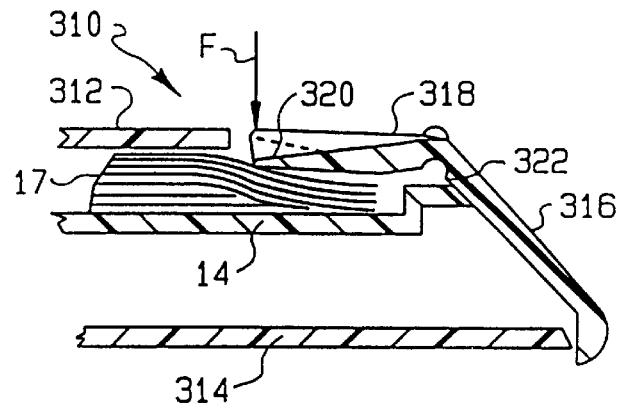
FIG. 10A is a partial sectional view of FIG. 10.

FIG. 10 illustrates embodiment D of a storage container 310 according to the present invention. In embodiment D, the shell 12 is comprised of closure 312, rear face 314, two side walls (not shown) and a bottom panel member (not shown). The shell closure 312 does not include a central cut-out as in the other embodiments described herein. Rather, the cut-out portion of closure 312 in the subject embodiment extends entirely across the closure from one side wall to the other. Thus, as shown in FIGS. 10 and 10A, the drawer lid 316 includes flanged portion 318 across the entire width of the lid which extends over the printed matter 17 lying below the cut-out portion of closure 312. Flange 318 further includes a substantially pliable portion 320. The user can extract printed matter 17 with the drawer 14 by applying a force F to the pliable portion 320 when pulling on the lid 316 to compress and grip printed matter 17 between pliable portion 320 and drawer 14. The pliable portion 320 can be a flange member attached to the drawer lid 316 via a flex hinge 322 or could be comprised of a portion of lid flange 318 having a cross section which is thinner than the remainder of flange 318.

Figure 11:
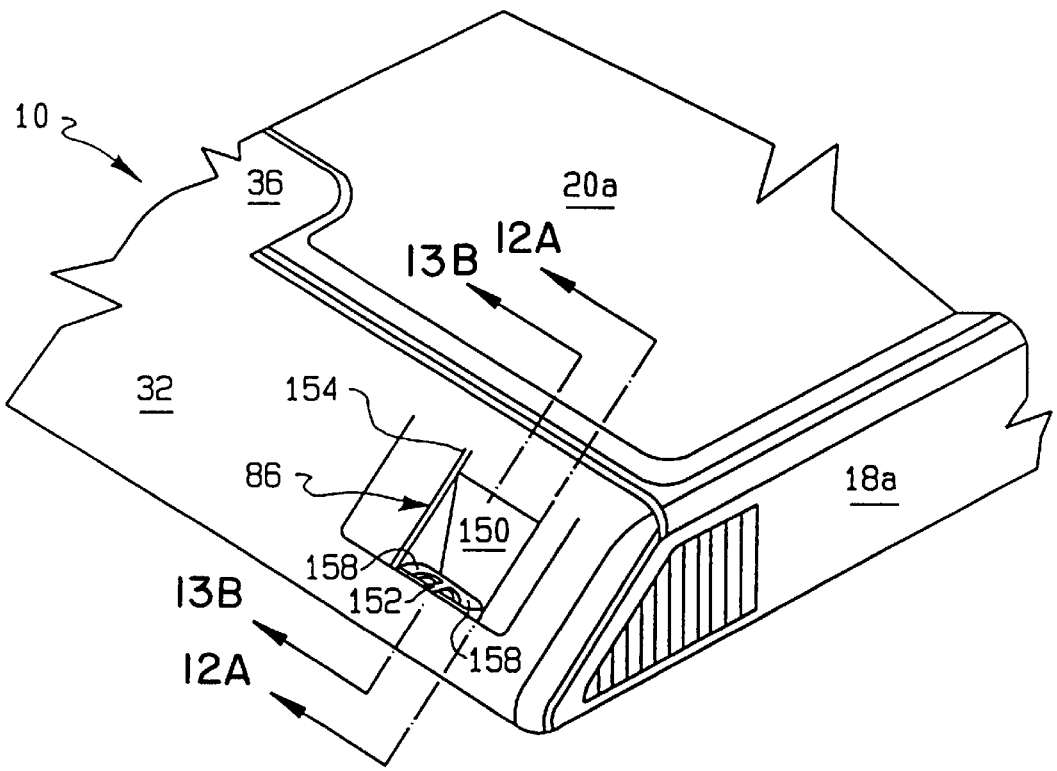
FIG. 11 is a partial perspective view of the storage container of Embodiment A illustrating one embodiment of the tamper seal of the invention.

FIG. 11 illustrates a first embodiment of a tamper seal 86 for use with storage container 10 of the invention. Tamper seal 86 is comprised generally of a hooked member comprising a shaft 150 and a filament 152 which are both formed integral with the storage container 10. Shaft 150 is connected at a first end to lid 32 by a hinge 154. The second end of shaft 150 is adapted to coact with the groove 48 in the shell rear face 20b as described below.

The filament 152 is a relatively thin elongated member having a first end and a second end. The first end of filament 152 is connected to the second end of the shaft 150, while the other end of the filament is connected to lid 32. Thus, the shaft 150 is connected to the drawer member lid 32 in two locations, at hinge 154 and at the filament 152. The filament 152 provides a weak connection to the drawer lid 32 such that when the drawer 14 is pulled from the shell 12 for the first time, the filament 152 to lid 32 connection is broken due to the force exerted.

FIG. 12 illustrates the storage container of FIG. 11 in a closed condition. The shaft 150 extends to a tip portion in the form of a hook 156 which includes a curved or angled surface 160 and a second surface 162. Hook 156 is inserted into the groove 48 in the shell rear face 20b when the drawer 14 is inserted into shell 12 for the first time. Preferably, two support members 158 extend from the hook 156 to abut the drawer member lid 32 and provide support for the shaft 150 when the drawer 14 is inserted into the shell 12 such that the filament 152 is not broken upon the insertion of the drawer 14.

Thus, when the drawer 14 is inserted into the shell 12 for the first time, the hook 156 slides over the top edge of the shell rear face 20b and into the seal groove 48, aided by the curved surface 160 and the support members 158. Once the drawer 14 is secured in the shell 12, the tabs 100 lock the drawer member between the shell closure 20a and the shell rear face 20b to prevent any movement of the drawer 14 except for lateral translational movement in a direction parallel to faces 20a and 20b of shell 12.

FIG. 13 illustrates how seal 86 operates when storage container 10 is opened. When the drawer 14 is pulled from the shell 12, flat surface 162 on shaft 150 abuts the edge of groove 48. The force of extracting the drawer 14 is greater than the strength of the filament 152 which therefore breaks, allowing the shaft 150 to rotate about the hinge 154 and slide over the edge of groove 48. Thus, a user must break the filament 152 in order to open the storage container 10 for the first time. Subsequent openings would be unaffected by the seal 86. In this manner, interested parties such as retail merchants can readily observe whether the filament 152 is intact to determine whether the storage container 10 has been opened.

FIG. 14 illustrates another embodiment of a tamper seal 170 formed integral with storage container 10. The tamper seal 170 comprises a finger 172 which is attached to the shell rear face 20b within recess 174. In this embodiment, the finger 172 is integral with the shell 12 rather than the drawer 14 as in the previous embodiment described above.

Figure 14A:
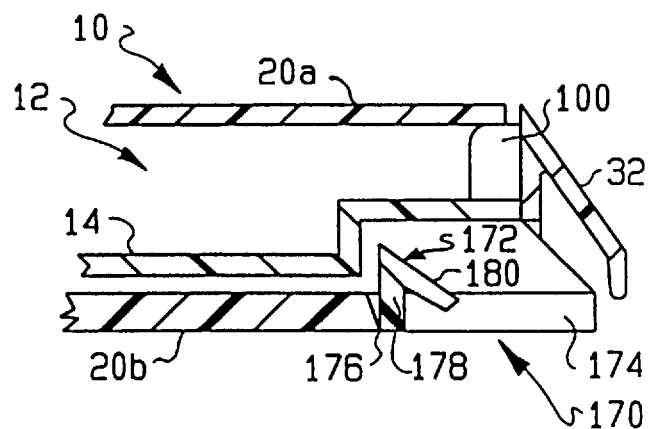
FIG. 14A is a partial sectional view of the tamper seal of FIG. 14 taken along the line a—a of FIG. 14.

FIG. 14A illustrates additional features of tamper seal 170 shown in FIG. 14. Finger 172 is attached to the shell rear face via a breakable joint 176. Finger 172 comprises an upwardly extending portion abutting breakable joint 176 with a ramped surface 180 at the free end thereof. The ramped surface 180 is used to provide a sloped surface which the drawer can ride over when inserting drawer 18 into shell 12 without breaking joint 176. The upwardly extending portion 178 of seal 170 interacts with the drawer 14 such that when the drawer is extracted from the shell 12, it abuts against finger 172, which rotates in a clockwise direction and snaps the breakable joint 176. Thus, one may observe whether finger 172 is intact to determine whether the storage container 10 has been opened.

Figure 15:
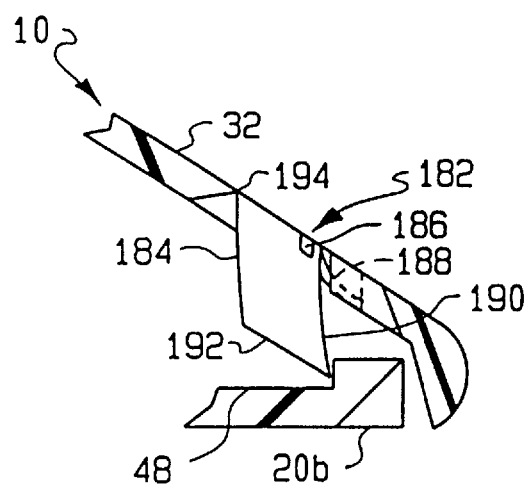
FIG. 15 is a partial sectional view of a storage container of the invention incorporating yet another embodiment of the tamper seal.

FIG. 15 shows yet another embodiment of a tamper seal 182 for use with the container of the invention. Tamper seal 182 comprises finger 184, web 186 and leaf spring 188. The finger 184 has a first end attached to the drawer member lid 32 via a hinge 194 and is additionally attached to the drawer lid 32 by web 186. The leaf spring 188 is interposed between and attached to the drawer member lid 32 and the finger 184. Finger 184 further comprises a second end having a flat surface 190 and a ramped surface 192. The ramped surface 192 facilitates insertion of the drawer 14 into shell 12 while the flat surface 190 coacts with the groove 48 in the shell rear face 20b when the drawer is pulled out as described below.

Figure 15A:
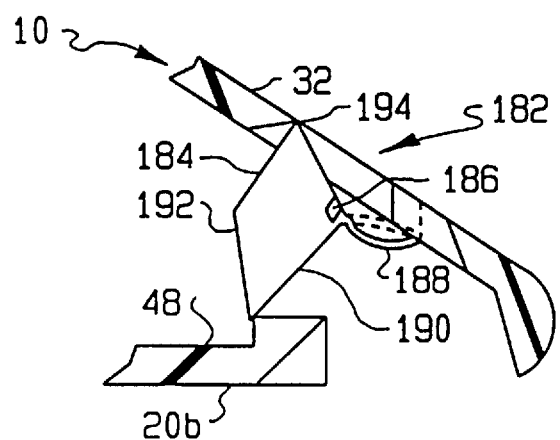
FIG. 15A is a partial sectional view of the tamper seal of FIG. 15 taken along the line a—a of FIG. 15 as the drawer member is being pulled from the shell.

FIG. 15A illustrates what occurs when the storage container 10 is opened. The flat surface 190 of finger 184 coacts with the edge of the groove 48 to rotate the finger 184 about the hinge 194 when the drawer 14 is slid from the shell 12. The initial rotation of the finger 184 breaks the web 186. This provides the indication that the storage container has been opened. Further rotation of the finger 184 causes the leaf spring 188 to snap into a second position, shown in phantom, which will maintain the finger 184 in the rotated position so that it does not engage with the groove 48 and thus interfere with subsequent openings and closings of the storage container 10.

Figure 16:
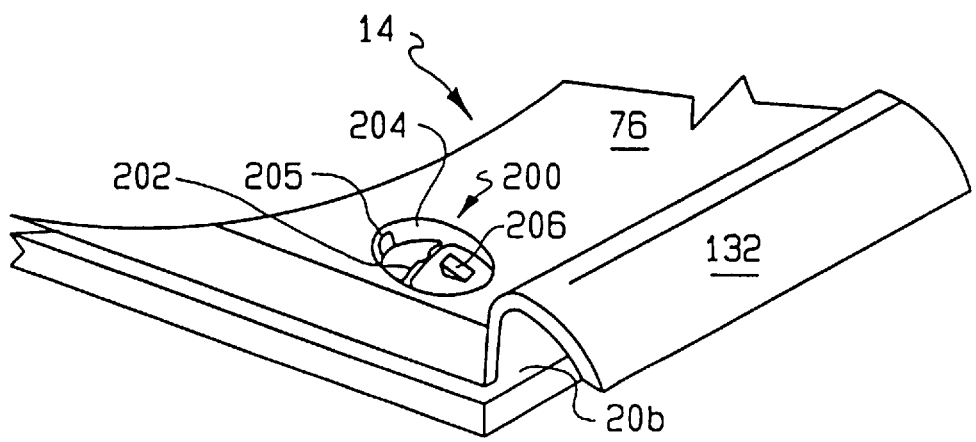
FIG. 16 is a partial perspective view of a storage container of the invention incorporating still another embodiment of the tamper seal.

FIG. 16 shows still another embodiment of tamper seal 200. Seal 200 comprises filament 202 which is connected at its ends to walls 204 of an aperture defined by drawer 14. Seal 200 further comprises a ramp 206 projecting from the inner surface of the shell rear face 20b. When the container is first sealed, filament 202 is proximate to ramp 206 on shell rear face 20b. The filament 202 coacts with ramp 206 such that when the drawer 14 is extracted from the shell 12 for the first time, the filament 202 is broken by the ramp 206. An opening 205 is provided through the base of drawer 14 for the ramp 206 to fit through as the drawer member is further extracted from the shell 12. It is also possible for the ramp 206 to project from the shell rear face 20b near the top thereof.

The various embodiments of the seals discussed herein can be incorporated in any of the storage container embodiments A, B, C or D as well as other configurations. As is evident from the descriptions above, the seal embodiments are configured to provide abutting contact between the stationary shell 12 and the sliding drawer 14 so that a small filament or web member is severed upon the first translational movement of the drawer 14 when the same is pulled from the outer shell 12.

Figure 17:
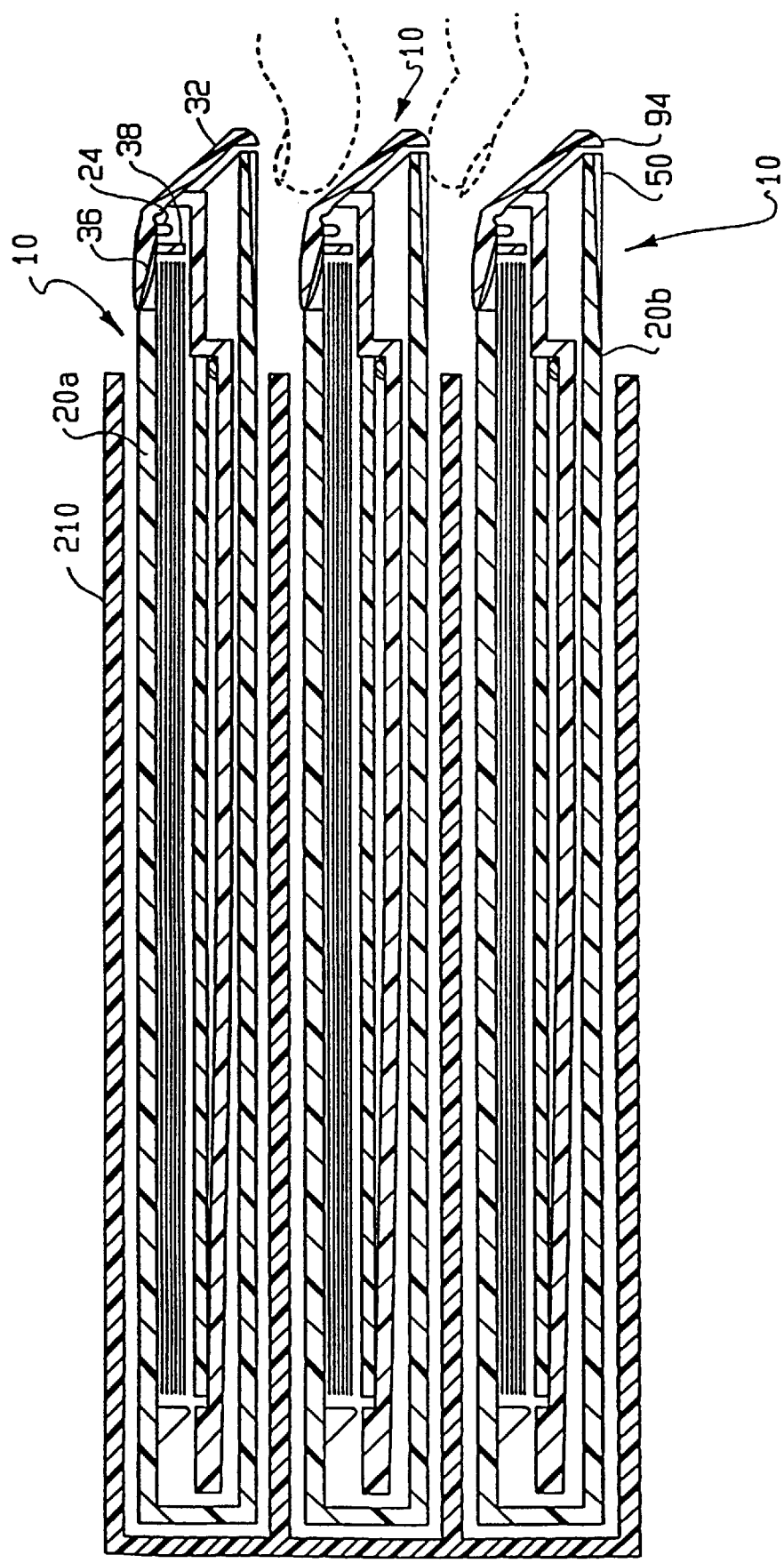
FIG. 17 is a cross-sectional view of a plurality of storage containers constructed according to the present invention as they appear stacked within a storage unit.

Turning now to FIG. 17, a plurality of storage containers 10 are shown stacked within a storage unit 210. Unit 210 is a representative example of various storage means presently on the market in which consumers house their disc storage containers. In the alternate, however, consumers often dispense entirely with such storage units and simply stack their disc containers upon some flat surface, one atop the other. Typical prior art, i.e., "jewel box" disc storage containers, when stacked within or without multiple disc storage units, had to be completely removed from the stack to access the discs stored therein. FIG. 17 illustrates how the present invention greatly increases the accessibility of both discs and/or printed matter stored in containers 10. More particularly, both the disc and the printed matter can be selectively accessed by simply grasping lid 32 and pulling the drawer member from the outer shell, following which the top segment of the drawer is rotated downwardly away from the under surface of the disc as shown in FIG. 3. Due to the angled orientation of lid portion 32, the draw top segment rotates downwardly out of the way without substantial interference from the lid of the next downwardly stacked container.

As described above, the drawer member includes lid portion 32 for substantially closing the top end of the outer shell. It is readily apparent that if lid 32 were perpendicular to the front and rear faces 20a and 20b of the shell, consumers would not be readily able to insert their fingers between the storage containers 10 for grasping the lid portion 32. Thus, the lid portion 32 of the container of the invention is oriented at an angle other than perpendicular to the planes of the front and rear faces 20a and 20b, preferably at an angle of approximately 45 degrees to these planes. This angle is not critical, however, and thus lid 32 can be oriented at any angle which facilitates access by the user's fingers. This angled orientation enhances accessibility to the drawer member by allowing the consumer's fingers (shown in phantom) to more easily grasp the lid portion 32 and pull the drawer member from the outer shell to access the disc therein.

Alternately, as noted above instead of comprising an angled planar surface (as shown), the lid may instead be molded in a geometric shape such as a crescent or half-moon for example to produce a pleasing decorative effect, while maintaining its functionality and ease of access. The shapes described herein are not limitative of the invention, however, as one of ordinary skill in the art would readily understand that a variety of additional shapes could alternatively be chosen. To facilitate access still further, the lid may include a gripping edge 94 located along the under surface of the lid portion 32, adjacent the rear face 20b when the drawer member is inserted into the outer shell. Additionally, shell rear face 20b may also include ramped surface 50 proximate to the lid gripping edge 94 when the drawer 14 is inserted into the shell 12. Ramp 50 makes it easier for the consumer to slide a finger behind the lid 32 for grasping the gripping edge 94 to extract the drawer 14 from the shell 12.

While it is apparent that the invention herein disclosed is well calculated to fulfill the functions and advantages above stated, it will be appreciated that numerous modification and embodiments may be devised by those skilled in the art and it is intended that the appended claims cover such modification and embodiments as fall within the spirit and scope of the present invention.

We claim:

1. A storage container for a disc containing recorded data, comprising:

a shell having a rear panel, two side panels, a bottom member and a closure, the upper end of said shell being open, a drawer for holding a disc, said drawer being slidably receivable in the upper end of said shell, said drawer having a top segment and a bottom segment that are hinged together, said bottom segment including outwardly extending, flexible side walls with respect to said bottom segment, said flexible side walls being adapted to engage the inner surfaces of the side panels of said shell; and a printed material inserted in the shell, wherein the top and bottom segments of the drawer each include seating surfaces for retaining the disc, and wherein the areas adjacent the seating surfaces are bevelled to facilitate movement of the drawer relative to the printed material.

2. A disc storage according to claim 1, wherein each of said flexible sidewalls having a leading edge facing said bottom member, said leading edge being bevelled to help guide the drawer into the shell, the sidewalls being approximately the same height as the side panels of the shell.

3. A storage container for a disc according to claim 1, further including disc retention means, said disc retention means comprising a recessed portion having a transverse surface and at least two flanges extending inwardly from said transverse surface to form disc capturing grooves between the flanges and the recessed portion, and points at the ends of the flanges for holding the disc.

4. A storage container for a disc according to claim 3, wherein the upper portion of the bottom segment is bevelled to help guide the disc into the disc retention means.

5. A storage container for a disc according to claim 1, wherein the upper end of each side panel includes an inwardly projecting member having a bevelled leading edge to facilitate entry of at least one of a booklet and the drawer into the shell.

6. A storage container for a disc according to claim 5, including small projections on the sides of said drawer, said projections being located relative to said inwardly projecting members.

7. A storage container for a disc according to claim 1, including a booklet retention nub on the undersurface of said closure at its upper end, said nub having a leading edge facing said upper end, said leading edge being bevelled to facilitate introduction of a booklet into the shell.

8. A storage container for a disc according to claim 7, wherein the booklet has substantially the same dimensions as the closure of the shell.

9. A storage container for a disc according to claim 1, wherein the bottom segment of the drawer is shaped to facilitate its introduction into the shell.

10. A storage container for a disc containing recorded data, comprising:
- a shell having a rear panel, two side panels, a bottom member and a closure, the upper end of said shell being open, and
- a drawer slidably receivable in the upper end of said shell, said drawer having a top segment and a bottom segment that are hinged together, said drawer including disc retention means for holding a disc, said disc retention means comprising a recessed portion having a transverse disc seating surface, at least two flanges extending inwardly from said seating surface to form disc capturing grooves between the flanges and the recessed portion, and points at the ends of the flanges for applying pressure to the edge of the disc.

11. A storage container for a disc according to claim 10, wherein the rear panel of the shell forms substantially the entire rear panel of the container.

12. A storage container for a disc according to claim 10, wherein the upper end of each side panel includes an inwardly projecting member having a bevelled leading edge to facilitate entry of at least one of a booklet and the drawer into the shell.

13. A storage container for a disc according to claim 10, including booklet retention nubs on the undersurface of said closure at its upper end, each of said nubs having a leading edge facing said upper end, said leading edge being bevelled to facilitate introduction of a booklet into the shell.

14. A storage container for a disc according to claim 10, including a booklet of printed matter within the container wherein said booklet has substantially the same planar dimensions as the closure of the shell.

15. A storage container for a disc according to claim 10, wherein the bottom segment of the drawer is shaped to facilitate its introduction into the shell.

16. A storage container for a disc according to claim 10, wherein the upper portion of the segment is bevelled to help guide the disc into the disc retention means.

17. A storage container for a disc containing recorded data, comprising:
- a shell having a rear panel, two side panels, a bottom member and a closure, the upper end of said shell being open, the upper end of each side panel including an inwardly projecting member having a bevelled leading edge to facilitate entry of at least one of a booklet, an advertising insert, or a drawer into the shell, and
- a drawer for holding a disc, said drawer being slidably receivable in the upper end of said shell, said drawer having a top segment and a bottom segment that are hinged together.

18. A storage container for a disc according to claim 17, wherein each of said inwardly projecting members includes a trailing edge facing said bottom member for preventing full withdrawal of the drawer.

19. A storage container for a disc according to claim 17, wherein the rear panel of the shell forms substantially the entire rear panel of the container.

20. A storage container for a disc according to claim 17, including booklet retention nubs on the undersurface of said closure at its upper end, each of said nubs having a leading edge facing said upper end, said leading edge being bevelled to facilitate introduction of a booklet into the shell.

21. A storage container for a disc according to claim 17, including a booklet of printed matter within said container wherein said booklet has substantially the same dimensions as the closure of the shell.

22. A storage container for a disc containing recorded data, comprising:
- a shell having a rear panel, two side panels, a bottom member and a closure, the upper end of said shell being open;
- a drawer for holding a disc, said drawer being slidably receivable in the upper end of said shell, said drawer having a top segment and a bottom segment that are hinged together, said bottom segment including outwardly extending, flexible side walls with respect to said bottom segment, said flexible side walls being adapted to engage the inner surfaces of the side panels of said shell; and
- wherein each of said flexible side walls having a leading edge facing said bottom member, said leading edge being bevelled to help guide the drawer into the shell, the side walls being approximately the same height as the side panels of the shell.

23. A storage container for a disc containing recorded data, comprising:
- a shell having a rear panel, two side panels, a bottom member and a closure, the upper end of said shell being open;
- a drawer for holding a disc, said drawer being slidably receivable in the upper end of said shell, said drawer having a top segment and a bottom segment that are hinged together, said bottom segment including outwardly extending, flexible side walls with respect to said bottom segment, said flexible side walls being adapted to engage the inner surfaces of the side panels of said shell; and
- further including disc retention means, said disc retention means comprising a recessed portion having a transverse surface and at least two flanges extending inwardly from said transverse surface to form disc capturing grooves between the flanges and the recessed portion, and points at the ends of the flanges for holding the disc.

24. A storage container for a disc containing recorded data, comprising:
- a shell having a rear panel, two side panels, a bottom member and a closure, the upper end of said shell being open;
- a drawer for holding a disc, said drawer being slidably receivable in the upper end of said shell, said drawer having a top segment and a bottom segment that are hinged together, said bottom segment including outwardly extending, flexible side walls with respect to said bottom segment, said flexible side walls being adapted to engage the inner surfaces of the side panels of said shell; and
- wherein the upper end of each side panel includes an inwardly projecting member having a bevelled leading edge to facilitate entry of at least one of a booklet and the drawer into the shell.

25. A storage container for a disc containing recorded data, comprising:
- a shell having a rear panel, two side panels, a bottom member and a closure, the upper end of said shell being open;
- a drawer for holding a disc, said drawer being slidably receivable in the upper end of said shell, said drawer having a top segment and a bottom segment that are hinged together, said bottom segment including outwardly extending, flexible side walls with respect to said bottom segment, said flexible side walls being adapted to engage the inner surfaces of the side panels of said shell; and
- including a booklet retention nub on the undersurface of said closure at its upper end, said nub having a leading edge facing said upper end, said leading edge being bevelled to facilitate introduction of a booklet into the shell.

* * * * *